United States Patent [19]

Spurlock et al.

[11] 4,213,194
[45] Jul. 15, 1980

[54] ACOUSTIC ARCHEOLOGICAL MAPPING METHOD

[75] Inventors: Eugene M. Spurlock, Menlo Park, Calif.; Carl W. Smith, Albuquerque, N. Mex.

[73] Assignee: SRI International, Menlo Park, Calif.

[21] Appl. No.: 904,748

[22] Filed: May 11, 1978

[51] Int. Cl.² .............................................. G01V 1/20
[52] U.S. Cl. ..................................... 367/14; 181/112; 181/122; 367/47; 367/58
[58] Field of Search ............... 340/15.5 CP, 15.5 SW, 340/15.5 MC, 15.5 BH, 15.5 R, 15.5 AC; 181/112, 122, 125; 367/14, 47, 58

[56] References Cited

U.S. PATENT DOCUMENTS

| 1,743,358 | 1/1930 | Koenigsberger | 340/15.5 R |
| 2,331,080 | 10/1943 | Petty | 340/15.5 CP |
| 2,693,862 | 11/1954 | Rieber | 340/15.5 MC |
| 3,252,131 | 5/1966 | Vogel | 340/15.5 SW |
| 3,292,143 | 12/1966 | Russell | 340/15.5 R |
| 3,362,011 | 1/1968 | Zemanek, Jr. | 340/15.5 SW |
| 3,836,952 | 9/1974 | Johnson | 340/15.5 CP |

OTHER PUBLICATIONS

R. F. Doherty et al., Geophysical Prospecting, #19, pp. 430–458, 1971.

Primary Examiner—S. C. Buczinski
Attorney, Agent, or Firm—Victor R. Beckman

[57] ABSTRACT

A method of locating near-surface underground chambers, rooms, caves, pits, tubes, faults in surface rocks, and the like, using acoustic techniques is disclosed. For mapping large areas, a survey grid for transmitter transducer placement first is laid out over the area of interest.

A transmitting transducer is coupled to the bedrock at one of the grid sites, and acoustic waves are generated in the earth by operation thereof. Portable acoustic receiving means, including a receiving transducer, are used to detect acoustic waves from the transmitter at a plurality of receiving sites surrounding the transmitting station. Transmitted acoustic waves from the transmitting site received by the receiving transducer are converted to electrical signals by the receiving transducer and recorded for subsequent use. Following operation of the receiving means at each receiving site surrounding the transmitter transducer, the received signals are compared to determine any differences in their magnitudes. In competent rock, without the presence of subterranean discontinuities, substantially equal signals are received at receiving sites equally spaced from the transmitting site. If equal length acoustic paths are not employed, the different acoustic absorption due to the different-length paths must be considered in determining differences in received signal strength. This check for discontinuities is repeated with the transmitting transducer positioned at each of transmitting transducer sites of the survey grid until the entire area is mapped. At areas which indicate subterranean discontinuities the above-described process may be repeated to better identify the discontinuities. Now, however, shorter distances between the transmitting transducer and the receiving sites are employed, and operation preferably is at a higher operating frequency for increased resolution. Also, whereas pulse or continuous wave operation is used for the initial survey, now pulse operation preferably is employed for distinguishing between received longitudinal, transverse and surface waves which travel at different velocities within the rock and, thereby, are received at different times following pulse transmission operation of the transmitting transducer. Absorption of the different waves is dependent upon the medium through which the waves travel. Using pulse operation, this information too is available to the operator for use in analysis of the discontinuity encountered.

10 Claims, 15 Drawing Figures

ACOUSTIC ARCHEOLOGICAL MAPPING METHOD

BACKGROUND OF THE INVENTION

Seismic methods for locating underground discontinuities are well known, which methods often include the generation of seismic waves at one location and the detection of refracted or reflected seismic waves from the discontinuity at the same or different locations. However, few prior art seismic methods are suitable for locating underground chambers, caves, covered pits, rooms, tunnels, tubes, or the like, and it is possible that many sites of archeological interest have eluded discovery using such conventional seismic exploration techniques. A method for locating tunnels, or the like, is shown in U.S. Pat. No. 3,836,952 wherein continuous waves are transmitted and deviations in the phase angle difference between the transmitted and received waves as the span between the transmitting and receiving transducers is displaced or changed are taken as indicative of a tunnel, or the like. Heretofor, measurements of the amount of acoustic wave energy transmitted to receiving sites from a transmitting site, from which measurements energy differences are taken as being indicative of subterranean discontinuities, have not been employed for mapping of faults, underground chambers, and the like.

SUMMARY OF THE INVENTION AND OBJECTS

An object of this invention is the provision of an acoustic mapping method which employs a plurality of acoustic transmission measurements to provide information as to the location of underground discontinuities.

An object of this invention is the provision of an improved method of locating underground chambers, covered pits such as boat pits, faults, and like discontinuities, which method relies upon the different acoustic wave transmission characteristics of the discontinuity from surrounding rock for locating the same.

An object of this invention is the provision of an improved acoustic method of locating underground chambers, rooms, covered pits, tunnels, and the like, in near-surface rock formations and distinguishing the same from faults and boundaries of competent rock formations.

In accordance with the present invention, a survey grid may be established identifying locations at which a transmitting transducer is to be located during an initial survey. With the transmitting transducer in place at a transmitting site, acoustic waves are generated in the earth by operation of a transmitter associated with the transmitting transducer. Using one or more receiving transducers, transmitted acoustic wave energy at a plurality of surface receiving sites surrounding the transmitting transducer is detected and converted to electrical signals. A comparison of the magnitude of acoustic wave energy received at the receiving sites provides an indication of the nature of subterranean conditions surrounding the transmitting transducer out to the receiving transducer sites. Differences in magnitude of received acoustic wave energy at receiving sites equally spaced from the transmitting transducer are indicative of subterranean discontinuities, whereas equal strength acoustic signals received at such receiving sites are indicative of competent rock with no discontinuities. The process is repeated with the transmitting transducer located at each selected transmitting site of the survey grid. Upon completion of the above-described initial survey areas at which subterranean discontinuities are indicated are further acoustically investigated to more precisely locate the position and size of the feature. The same equipment may be employed using the same methods, but on a much smaller scale. Also, higher frequency signals may be employed for better resolution. Now, preferably, pulse transmission is used in order that the received longitudinal, transverse, and surface waves may be individually identified. These waves travel at different velocities and may be separated due to different times of arrival at the receiver. With this additional information it is possible to distinguish between subterranean chambers, tunnels, and the like, which are carved directly in the bedrock, and pits which have separate covers formed of slabs of rock.

The invention, as well as the above and other objects and advantages thereof will become apparent from the following detailed description when considered with the accompanying drawings.

BRIEF DESCRIPTION OF THE DRAWINGS

In the drawings, wherein like reference characters refer to the same parts in the several views.

The present acoustical method has application to geophysics, mining, archaeology, and the like. For purposes of illustration, use in archaeology is shown and described herein. In archaeology, excavation must proceed so slowly and systematically that a given site may require decades for complete exploration. It is important, therefore, to know ahead of time the areal extent of a site and the best possible areas to dig first. The remote sensing method of the present invention may be performed rapidly and provides the archaeologist with valuable maps showing subterranean areas of most interest and potential.

Figure 1:
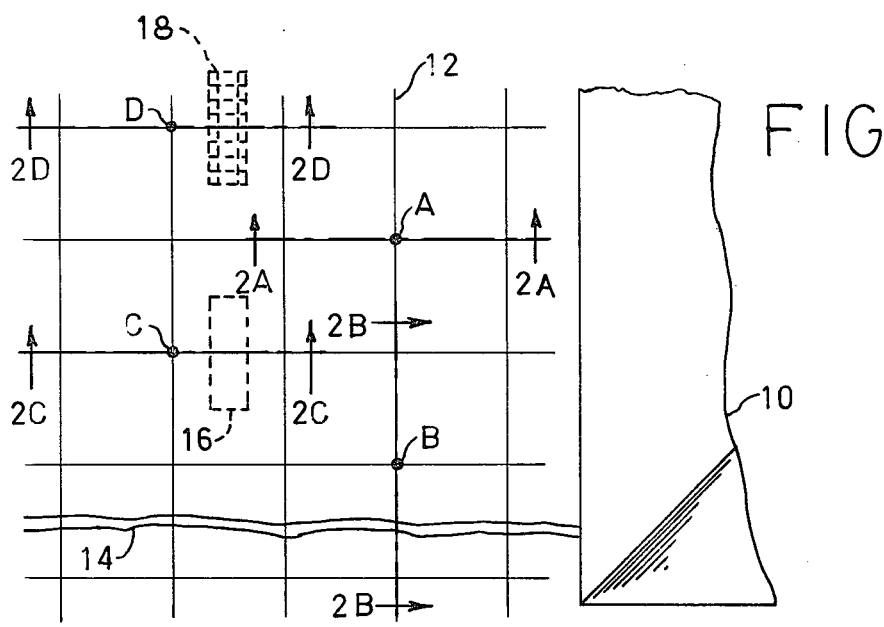
FIG. 1 is a plan view of an area to be surveyed using the present invention and showing a survey grid for transmitter transducer placement for use in initial mapping of the near-surface subterranean volume.

In FIG. 1, to which reference now is made, there is shown, in plan view, a portion of a pyramid 10 together with an adjacent area to be mapped using the present invention. For mapping large areas, a survey grid 12 may be established wherein the spacing between adjacent grid lines is selected, inter alia, for the overall area of the site to be surveyed, the acoustic characteristics of the bedrock thereat, the size of the anomaly for which the search is being conducted, and the like. Typically, distances on the order of, say, 20 to 150 meters, at operating frequencies ranging from 0.5 to 5 kHz would be employed for this initial large-scale survey. Intersections of the grid lines simply represent sites at which a transmitting transducer is to be coupled to the earth for the generation of acoustic vibrations at such sites. Acoustic frequencies employed in the practice of this invention include those in the range of, say, 0.5 to 20 kHz, which range includes most of the sonic frequency range and low ultrasonic frequencies. As noted herein below, the higher frequency signals are effective over shorter distances and are used to better delineate discontinuities located during the initial survey which employs the lower frequency acoustic waves. Acoustic signals employed in the practice of this invention are of higher frequency than seismic signals, permitting greater resolution and detection of smaller discontinuities.

When a transmitting transducer attached to the bedrock at one of the transmitting sites identified by the grid pattern and operating at the selected frequency, a receiving transducer, or transducers, are located at receiving sites surrounding the transmitting site to receive acoustic waves transmitted thereto from the transmitting transducer. When receiver measurements have been made for each of the receiving sites, the transmitting transducer is moved to another transmitting site, and the acoustic sounding process is repeated. It will be seen, then, that the use of the coordinate system simply assures that the entire area will be mapped, and no portion thereof will be missed when using the method of this invention.

The present acoustic locating method is particularly adapted for use in rock, as opposed to soil or the like, in which attenuation of acoustic waves is so great as to severely limit the range of operation. Many archaeologically significant sites, including pyramid sites, were built on, or formed in, bedrock to make practical the acoustic sounding method of this invention thereat.

In FIG. 1, the area to be surveyed adjacent the pyramid 10, is shown to include therewithin a fault 14, tunnel 16, and funerary boat pit 18. Tunnels may lead to burial chambers, or the like, and boat pits may, of course, lead to the discovery of funerary boats and associated burial paraphenalia.

Figure 2A:
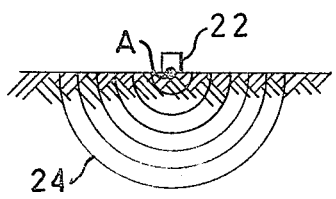
FIGS. 2A, 2B, 2C and 2D are sectional views taken along lines 2A—2A, 2B—2B, 2C—2C, and 2D—2D of FIG. 1 and showing competent rock, a fault in the bedrock, a tunnel, and a covered pit, respectively.
Figure 3A:
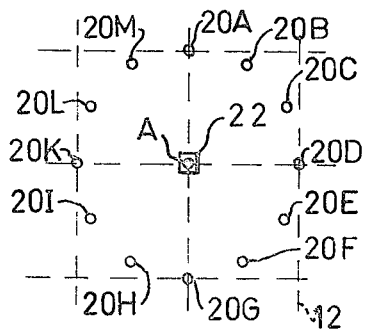
FIGS. 3A, 3B, 3C and 3D are plan views of the arrangements shown in FIGS. 2A, 2B, 2C, and 2D, respectively, showing transducer locations.

Reference now is made to FIG. 2A, a vertical sectional view taken along line 2A—2A of FIG. 1 and to FIG. 3A, a plan view thereof, which includes the showing of acoustic receiving sites 20A–20M. A portion of the grid pattern 12 is shown in phantom lines in FIG. 3A to illustrate the overlapping areas of coverage provided during the initial survey as the transmitting transducer is moved from site-to-site. For simplicity, as seen in FIG. 3A, a circular pattern of receiving transducer sites is shown. However, such a circular arrangement is not necessary for the practice of this invention if the different distances between the transmitting and receiving sites is considered when comparing acoustic signal strength measurements at the various sites. Also, more, or fewer, receiving sites than the twelve (12) illustrated may be used. In a practical arrangement, a single receiving transducer, with associated receiver and recording equipment, is moved to the various receiving locations surrounding the transmitting transducer for operation thereat. In an alternative arrangement, a plurality of receiving transducer means may be employed and simultaneously operated at the receiving sites.

The transmitting transducer 22, located at grid point A in FIGS. 2A and 3A, may comprise a piezoelectric element intimately coupled to the earth's surface. The ability to rapidly attach and detach the transducers to the bedrock without marring the surface is highly desirable for the illustrated archaeological use. Liquid, plastic, natural material such as clay, or the like, for coupling transducers to the earth are well known in the acoustic and seismic arts and require no detailed description.

The receiving transducer, or transducers, may comprise a piezoelectric device somewhat similar to that of the transmitting transducer. Acoustic transducers are well known and require no detailed description. Preferably, the transducers employed are operable over the entire frequency range over which the invention is adapted to be practiced, i.e. from approximately 0.5 to 20 kHz.

The acoustic method of this invention may employ either continuous or pulse mode operation. Preferably, but not necessarily, the equipment used in the practice of this invention is operable in either a continuous or pulse mode. For simplicity, operation at a selected single frequency rather than, say, in a frequency modulated mode is preferred. Frequency modulation, chirping, or like operation of well known type is not precluded in the practice of this invention, but where simplicity and economy are considerations, operation at a selected frequency is satisfactory. The wavelength of the acoustic signal employed should be shorter than the dimension of the subterranean feature to be delineated, since the shorter the wavelength the greater the scattering cross-section of the feature. Of course, absorption increases with increased frequency to limit the uppermost useable frequency for the selected transmitter-to-receiver transducer spacing. In Giza limestone, as an example, a 0.5 kHz acoustic wave has a wavelength of approximately 5.5 meters. For locating boat pits, or the like, having dimensions which exceed 5.5 meters, such low frequency operation is satisfactory. Of course small features with maximum dimensions much less than 5.5 meters are substantially "invisible" to such a frequency and would not be readily detected.

Figure 4A:
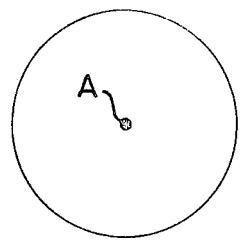
FIGS. 4A, 4B, 4C and 4D are polar plots of acoustic signal strength for the FIG. 2A, 2B, 2C and 2D arrangements, respectively.

In FIG. 2A, acoustic energy waves 24 are shown emanating from the transmitting transducer 22 located at transmitting site A of the grid 12. The transducer 22 comprises an omnidirectional point source whereby acoustic wave energy is propagated equally in all directions in the earth. Consequently, in competent rock, having no discontinuities, substantially equal magnitude acoustic wave energy is transmitted to receiving sites 20A–20M (FIG. 3A) equally spaced from the transmitting transmitting transducer 22. In FIG. 4A, a polar plot of the acoustic energy level for a distance from the transmitting transducer equal to the spacing between the transmitting and receiver transducer sites, shows equal level acoustic waves at such distance. Absorption of transmitted acoustic waves is substantially equal for each receiver location thereby indicating to the operator the absence of major discontinuities or faults within this particular area.

Figure 2B:
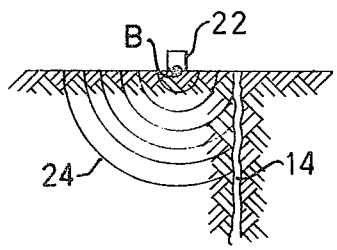
Figure 3B:
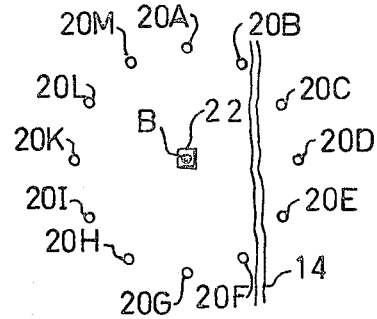
Figure 4B:
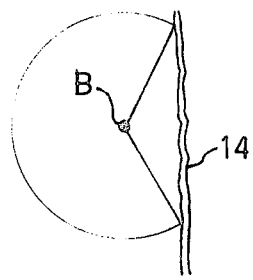

In FIGS. 2B and 3B, to which reference now is made, the transmitting transducer 22 is shown at grid site B (see also FIG. 1) adjacent a naturally occurring fault 14 running between the transmitting transducer site and receiving locations 20C–20E. Transmitted acoustic wave energy is substantially entirely blocked at the fault, preventing the energy from reaching the receiving sites 20C-20E located opposite the fault from the transmitting transducer. At this location, substantially equal amplitude acoustic energy waves are received at receiver sites 20A, 20B and 20F-20M, located at the same side of the fault as the transmitter transducer, whereas substantially zero level waves are transmitted to receiver locations 20C-20E opposite the fault. The polar plot of FIG. 4B shows such equal level acoustic wave signal strengths at receiving sites which are located on the transmitting transducer side of the fault 14, and zero level signal strengths at sites opposite the fault. It will be understood that some acoustic wave energy may be transmitted through the fault depending upon the contact between the fault walls. Generally, however, most acoustic wave energy is absorbed at or reflected from faults, and very little energy is transmitted therethrough.

Figure 2C:
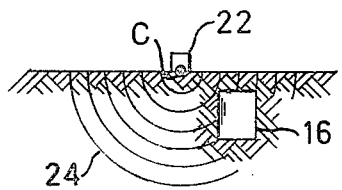
Figure 3C:
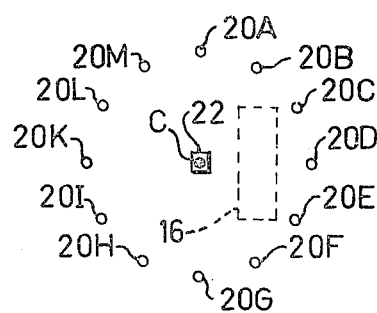
Figure 4C:
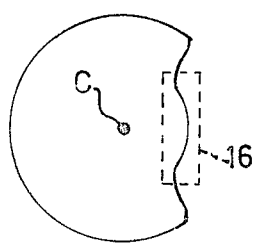

In FIGS. 2C and 3C, to which reference now is made, an underground chamber, or tunnel, 16 is shown curved out of the bedrock at the pyramid site. The transmitting transducer 22 is shown located at grid location C, and it will be noted that the tunnel 16 is located between the transmitting transducer and a number of receiving sites. Although much of the acoustic wave energy impinging on the tunnel walls is substantially prevented from reaching receiving sites, the solid rock surrounding the tunnel provides a good acoustic transmission path for acoustic waves. Consequently a relatively large amount of acoustic wave energy is transmitted to those receiving sites opposite the tunnel from the transmitting transducer. From the polar plot of acoustic wave energy for this situation, shown in FIG. 4C, it will be seen that the acoustic energy level at sites beyond the tunnel is only slightly reduced by the presence of the tunnel. Such reduced signal levels does, however, provide the operator with an indication of a subterranean discontinuity warranting further investigation.

Figure 2D:
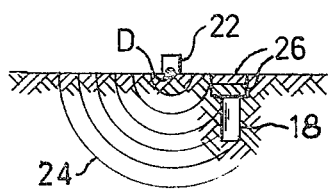
Figure 3D:
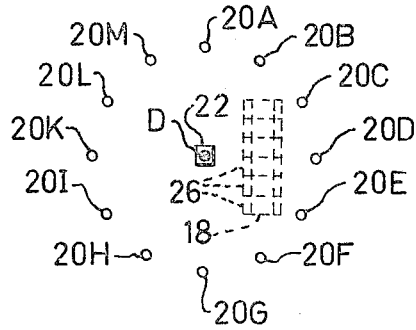
Figure 4D:
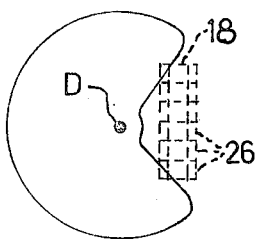

Reference now is made to FIGS. 2D and 3D wherein there is shown a funerary boat pit 18 of substantially the same size as the tunnel 16. As is understood, boat pits were constructed by forming an open trench in the bedrock within which the boat and other paraphenalia were located. The trench subsequently was covered with slabs 26 of the rock, which, in turn, was covered with sand and debris to prevent visual detection thereof. In FIGS. 2D and 3D, the transmitting transducer 22 is shown located at grid location D (which is in the same position relative to the boat pit as is the grid location C relative to the tunnel 16). Although the tunnel (FIGS. 2C and 3C) and boat pit (FIGS. 2D and 3D) situations appear similar, much less acoustic wave energy is transmitted to receiving sites located opposite the boat pit from the transmitting transducer than is transmitted to receiving sites located opposite the tunnel. It will be understood that the slabs 26, with associated interfaces, provide a relatively high acoustic impedance path (particularly for surface waves, as will be seen below) to substantially restrict the amount of acoustic energy reaching receiver sites opposite the boat pit. The polar plot of FIG. 4D shows a signal strength pattern similar to that of FIG. 4C, except that the amount of energy transmitted to receiving sites opposite the boat pit is substantially less than energy transmitted to receiving sites opposite the tunnel. In both instances there is a somewhat gradual, not abrupt, reduction in signal strength in going from a full signal strength site to a minimum signal strength site. This gradual energy reduction at such sites distinguishes features of this nature from a fault as shown in FIGS. 2A, 3A and 4A and described above.

The initial survey is completed after operation of the transmitting transducer at each of the transmitting sites of the survey grid, and a comparison of signals obtained at surrounding receiving sites has been made to identify areas which may contain a subterranean feature of interest, as indicated by amplitude differences in received signals. Pulse or continuous mode operation may be employed for this initial search phase, with continuous operation being preferred for maximum sensitivity.

Those areas at which subterranean discontinuities are indicated using the above-described method are subjected to further acoustic sounding to precisely delineate the shape and size thereof. Now, essentially the same technique as described above is employed, but preferably using higher frequency acoustic wave energy for greater resolution. Because the higher frequency signals experience greater attenuation, shorter distances between transmitter sites, and between the transmitter and surrounding receiving sites are required. For example, and not by way of limitation, a frequency in the range of, say, 5 to 20 kHz, with distances on the order of 5 to 20 meters may be employed. While this portion of the survey may be conducted using either pulse or continuous wave operation, pulse operation is preferred to provide means for distinguishing between tunnels and chambers carved in the bedrock and covered boat pits.

As is well understood, acoustic velocity is solely a function of the properties of the elastic medium within which the wave travels, and is independent of wavelength and frequency of the wave. It also is well known that longitudinal (compressional), transverse (shear) and surface (Rayleigh) waves are generated by operation of the transmitting transducer, and that such waves travel at different velocities within the bedrock; the longitudinal waves travelling at the highest velocity, the surface waves at the lowest velocity, and the transverse waves at an intermediate velocity. Using pulse operation, the various waves arrive at a receiving site at different times thereby allowing amplitude measurements on the individual wave types.

Figure 5:
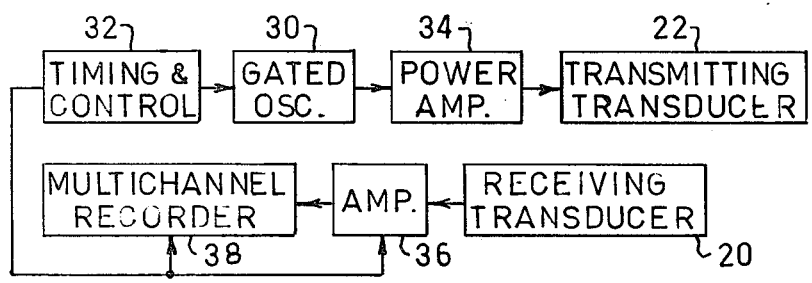
FIG. 5 is a simplified block diagram of suitable apparatus for use in practicing the present invention.

Continuous and pulse operating transmitting and receiving means for making measurements employed in the method of this invention are well known and require no detailed description. In FIG. 5, to which reference now is made, suitable pulse operating apparatus is shown comprising a gated oscillator 30 which is gated on and off under control of a timing and control unit 32. The pulse length employed depends upon the velocity of the acoustic waves in the rock and the minimum transmission distance employed. The pulse output from the oscillator is amplified by power amplifier 34 and supplied to the transmitting transducer 22.

In the FIG. 5 arrangement a single receiving transducer 20 is shown which may be moved to various receiving sites, such as sites 20A through 20M for each selected grid point. The received signals are amplified by amplifier 36, and may be supplied to one channel of a multichannel recorder 38. A second channel of the recorder may be supplied with timing signals from the timing and control unit 32 for use in subsequent data reduction.

Figure 6:
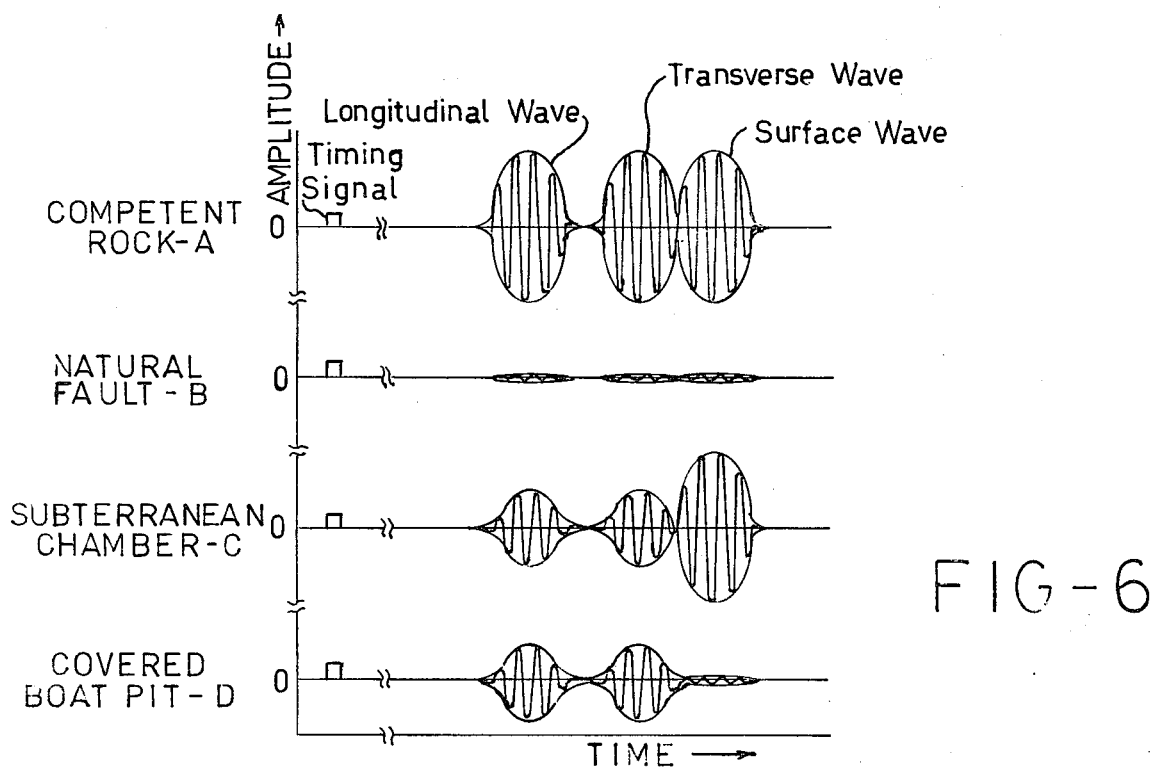
FIG. 6 is a diagram showing timing signals and received longitudinal, transverse and surface wave signals for various conditions illustrated in FIGS. 2A, 2B, 2C and 2D.

FIG. 6 is a timing diagram showing the timing signal and received longitudinal, transverse and surface waves. Signals received under four different operating conditions are depicted at lines A, B, C and D of the diagram which correspond to the competent rock, natural fault, subterranean chamber and boat pit cases illustrated in FIGS. 2A, 2B, 2C and 2D, respectively. In the natural fault, subterranean chamber and boat pit situations, the illustrated received signals are for receivers located opposite the natural fault, chamber or boat pit from the transmitting transducer. Note that in all cases the longitudinal waves arrive first, the transverse waves next, and finally the surface waves arrive.

For transmission in a substantially uniform medium, such as the illustrated competent rock situation (waveform A of FIG. 6), longitudinal, transverse, and surface waves are generated. For purposes of illustration only, equal-amplitude longitudinal, transverse and surface waves are shown at waveform A. However, in practice, detection of the acoustic wave types is a strong function of the wave amplitude and the sensitivity of the receiver.

Covered pits, chambers or tunnels, and naturally-occurring faults will affect the wave types in different ways, and the received relative amplitudes may be used to distinguish between such underground discontinuities. In FIG. 6, the amplitudes of waveforms B, C and D for the natural fault, subterranean chamber and covered pit situations, respectively, vary from the amplitudes of waveform A for the competent rock situation in the manner illustrated.

The longitudinal and transverse waves travel through the body of the rock, and the surface wave is confined to within approximately one wavelength of the surface. Because transverse and surface waves experience relatively little reflection at an interface, conventional acoustic sounding methods make no attempt to use such waves. In accordance with one aspect of the present invention, properties of transverse and surface waves are employed to distinguish between covered pits and subterranean chambers or tunnels carved from bedrock, in the manner described below. First, however, the natural fault situation depicted at waveform B of FIG. 6 will be considered. A natural fault occurring between the transmitting and receiving transducers is easily distinguished because substantially all the wave types will be substantially entirely attenuated, as also shown in FIGS. 2B and 4B. Additionally, faults are distinguished from man-made chambers, pits, and the like, by the lack of end effects. That is, as the receiver is placed at different locations (see, for example, FIGS. 2C and 4C) the ends of the structure can be delineated, but the fault crack continues in length and does not exhibit sharply-defined ends.

Where a subterranean chamber is located between the transmitting and receiving transducers (FIGS. 2C, 3C and 4C), the layer of bedrock over the chamber 16 provides a good transmission path for the acoustic waves. Consequently, all the wave types are transmitted to the receiver. However, due to the presence of the chamber, the amplitudes of the longitudinal and transverse waves are reduced, chiefly due to reflection at the rock-air interface. The surface wave amplitude, on the other hand, is substantially unaffected, as a comparison of waveforms A and C of FIG. 6 shows.

As described above, and shown in FIGS. 2D, 3D and 4D, the boat pit 18 is provided with a cover of rock slabs 26 and, because of imperfect contact at joints between slabs and between slabs and bedrock, the surface waves are substantially attenutated at the slab-bedrocks interfaces, whereby substantially no surface wave signal is received (see waveform D of FIG. 6). The longitudinal and transverse waves are limited to refracted and scattered paths around and beneath the pit in travelling to the receiver site, resulting in partial attenuation of these waves. The substantially complete lack of transmitted surface wave signal in this case provides a means of distinguishing covered pits from similar-sized chambers, tunnels, or the like, formed in or carved from the bedrock.

The invention having been described in detail in accordance with the requirements of the Patent Statutes, various changes and modifications will suggest themselves to those skilled in this art. As noted above, for example, a plurality of receiving transducers may be employed and simultaneously operated at a plurality of receiving sites. The receiver outputs may be simultaneously recorded on a suitable multichannel recorder for subsequent data reduction. Additionally, it will be apparent that the invention is not limited to acoustic soundings made at pyramid sites. Other archaeological uses of the method are contemplated. For example, the search for Pueblo Indian kivas may be conducted using the present method. Also, since the method is well adapted for locating cracks or faults in bedrock it may be used for determining the adequacy of building sites. In the case of nuclear power plants, for example, the site may be checked for faults to determine the competency of the bedrock before construction begins. This is of particular importance in earthquake prone regions where building of the plant on incompetent rock could prove to be hazardous. It is intended that the above and other such changes and modifications shall fall within the spirit and scope of the invention as defined in the appended claims.

We claim:

1. In a method of near-surface underground acoustic mapping for locating faults and voids in surface and subsurface rock including subterranean chambers, covered pits, and the like, the steps comprising
    generating acoustic waves in rock at a transmitting site at the surface of the earth,
    receiving, at a plurality of receiving sites spaced from the transmitting site, acoustic waves travelling near the surface of the earth from the transmitting site,
    comparing the magnitude of the transmitted acoustic waves received at the receiving sites, compensated for distance differences where said receiving sites are not equally spaced from the transmitting site, for identifying and distinguishing between deep surface faults and near-surface underground faults and voids through which substantially no acoustic wave energy is transmitted, an abrupt decrease in acoustic wave signals received at adjacent receiving sites identifying a deep surface fault in the surface rock, and a gradual decrease in acoustic wave signals received at adjacent receiving sites identifying a near-surface subterranean fault or void.

2. In a method of near-surface underground mapping as defined in claim 1 wherein continuous acoustic waves are generated at the transmitting site.

3. In a method of near-surface underground mapping as defined in claim 2 including sequentially moving a receiving transducer to the plurality of receiving sites and recording the level of acoustic wave signals received at each receiving site for subsequent comparison thereof.

4. In a method of near-surface underground mapping as defined in claim 1 wherein pulse longitudinal, transverse, and surface waves are generated at said transmitting site, and the levels of said longitudinal, transverse and surface waves at each receiving site are recorded for subsequent comparison thereof.

5. In a method of near-surface underground acoustic mapping for locating faults in surface rock and subsurface discontinuities including subterranean chambers, covered pits, and the like, the steps comprising generating acoustic pulse longitudinal, transverse, and surface waves in rock at a transmitting site at the surface of the earth, receiving, at a plurality of receiving sites substantially equally spaced from the transmitting site, acoustic waves travelling near the surface of the earth from the transmitting site, recording levels of said transmitted longitudinal, transverse and surface waves received at said receiving sites, comparing the magnitude of transmitted acoustic waves received at the receiving sites, a decreased magnitude of transmitted longitudinal and transverse waves at receiving sites without a decrease in magnitude of transmitted surface waves at said receiving sites identifying a subsurface discontinuity having a solid surface cover.

6. In a method of near-surface underground acoustic mapping for locating faults in surface rock and subsurface discontinuities including subterranean chambers, covered pits, and the like, the steps comprising generating acoustic pulse longitudinal, transverse, and surface waves in rock at a transmitting site at the surface of the earth, receiving, at a plurality of receiving sites substantially equally spaced from the transmitting site, acoustic waves travelling near the surface of the earth from the transmitting site, recording levels of said transmitted longitudinal, transverse and surface waves received at said receiving sites, comparing the magnitude of transmitted acoustic waves received at the receiving sites, a decreased magnitude of transmitted longitudinal and transverse waves together with substantially zero magnitude of transmitted surface waves at receiving sites identifying the subsurface discontinuity as a covered pit.

7. In a method of near-surface underground acoustic mapping for locating faults in surface rock and subsurface discontinuities including subterranean chambers, covered pits, and the like, the steps comprising generating acoustic pulse longitudinal, transverse and surface waves in rock at a transmitting site at the surface of the earth, receiving, at a plurality of receiving sites spaced from the transmitting site, acoustic waves travelling near the surface of the earth from the transmitting site, recording levels of said transmitted longitudinal, transverse and surface waves received at said receiving sites, and comparing the magnitude of transitted acoustic waves received at the receiving sites, compensated for distance differences where said receiving sites are not equally spaced from the transmitting site, a substantially abrupt cut-off of transmitted longitudinal, transverse, and surface waves at receiving sites identifying a fault in the surface rock, a decreased magnitude of transmitted longitudinal and transverse waves together with substantially zero magnitude of transmitted surface waves at receiving sites identifying a covered pit subsurface discontinuity, and a decreased magnitude of transmitted longitudinal and transverse waves at receiving sites without a decrease in magnitude of transmitted surface waves at said receiving sites identifying a subsurface discontinuity having a solid surface cover.

8. In a method of near-surface underground acoustic mapping for locating surface faults and near-surface underground faults and voids, through which faults and voids substantially no acoustic wave energy is transmitted, the steps comprising, generating pulse acoustic wave which include longitudinal, transverse and surface waves in rock at a transmitting site, receiving at a plurality of receiving sites spaced from the transmitting site separately identifiable longitudinal, transverse and surface acoustic waves travelling near the surface of the earth from the transmitting site, comparing the magnitude of separately identified transmitted longitudinal, transverse and surface acoustic waves received at the receiving sites, compensated for distance differences where said receiving sites are not equally spaced from the transmitting site, for identifying, and distinguishing between, surface faults and near-surface underground faults and voids.

9. In a method of near-surface underground acoustic mapping for locating faults in surface rock and subsurface discontinuities including subterranean chambers, covered pits, and the like, the steps comprising generating acoustic pulse longitudinal, transverse, and surface waves in rock at a transmitting site at the surface of the earth, receiving, at a plurality of receiving sites spaced from the transmitting site, acoustic waves travelling near the surface of the earth from the transmitting site, recording levels of said transmitted longitudinal, transverse and surface waves received at said receiving sites, comparing the magnitude of transmitted acoustic waves received at the receiving sites, compensated for distance differences where said receiving sites are not equally spaced from the transmitting site, a decreased magnitude of transmitted longitudinal and transverse waves at receiving sites without a decrease in magnitude of transmitted surface waves at said receiving sites identifying a subsurface discontinuity having a solid surface cover.

10. In a method of near-surface underground acoustic mapping for locating faults in surface rock and subsurface discontinuities including subterranean chambers, covered pits, and the like, the steps comprising generating acoustic pulse longitudinal, transverse, and surface waves in rock at a transmitting site at the surface of the earth, receiving, at a plurality of receiving sites spaced from the transmitting site, acoustic waves travelling near the surface of the earth from the transmitting site, recording levels of said transmitted longitudinal, transverse and surface waves received at said receiving sites, comparing the magnitude of transmitted acoustic waves received at the receiving sites, compensated for distance differences where said receiving sites are not equally spaced from the transmitting site, a decreased magnitude of transmitted longitudinal and transverse waves together with substantially zero magnitude of transmitted surface waves at receiving sites identifying the subsuface discontinuity as a covered pit.

* * * * *